United States Patent Office 3,555,140
Patented Jan. 12, 1971

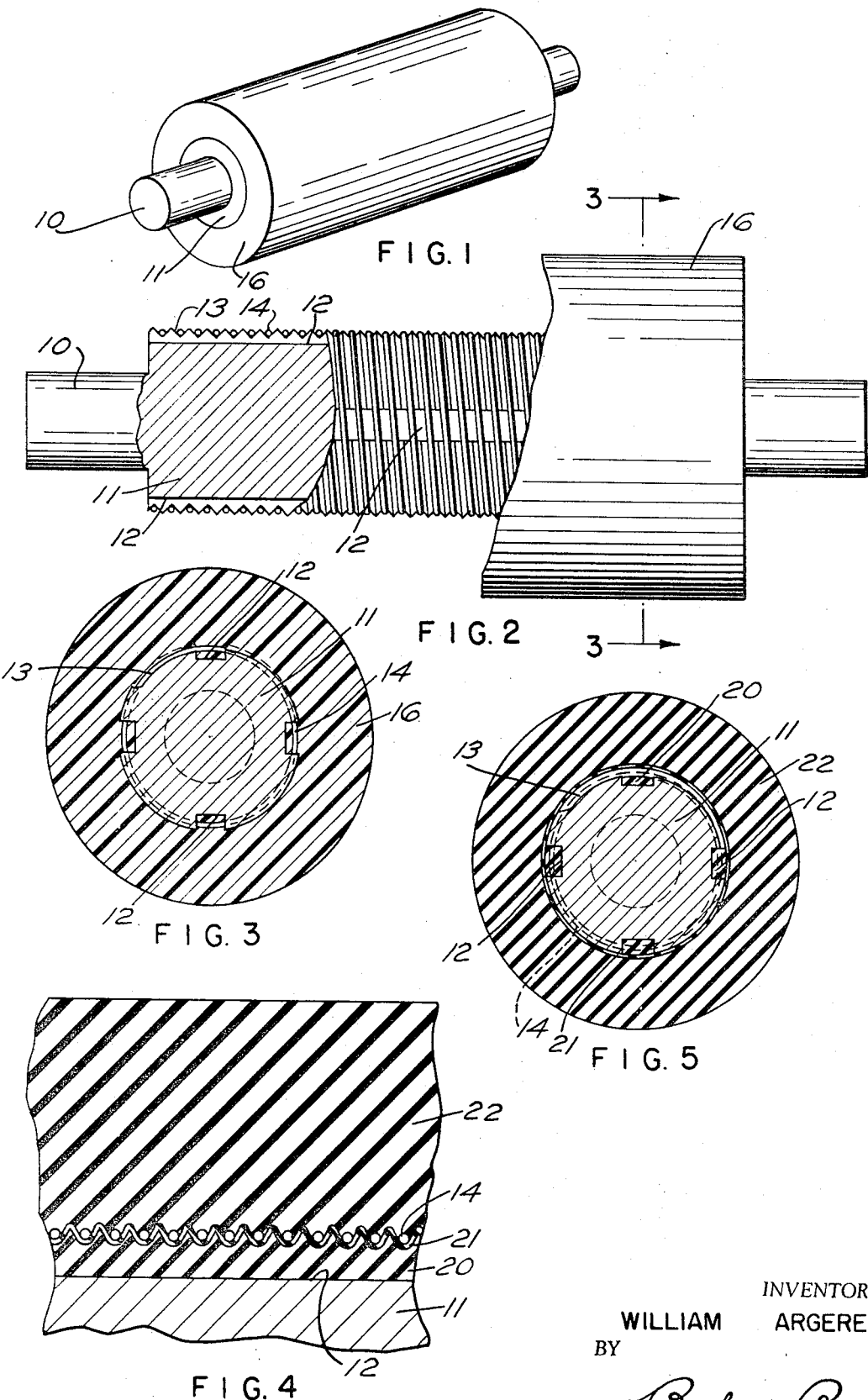

3,555,140
METHOD OF MAKING CONTACT ROLLS
William Argereu, Hickory Drive, Pole 4,
North Scituate, R.I. 02857
Filed Mar. 26, 1968, Ser. No. 716,209
Int. Cl. B29d *3/02;* B29h *9/00;* B32f *7/08*
U.S. Cl. 264—255                                5 Claims

ABSTRACT OF THE DISCLOSURE

A method of making a contact roll which will be cord reinforced consisting of threading an arbor and cutting grooves axially of the arbor through the threaded portion thereof. A reinforcing cord is helically wound in the threaded grooves in a fashion whereby the cord will pass over the grooves in a mesh type relationship and then covering the arbor so formed with a resilient material which may be either a plastic material cast about the arbor or may be uncured rubber that is inserted into the grooves and then layers of rubber are built up on the rolls in the usual fashion to the required diameter whereby the entire roll may be vulcanized to form an integral structure.

BACKGROUND OF THE INVENTION

In the manufacture of contact rolls such as for example drafting aprons for textile fiber use or contact rolls which engage another roll for feeding material, it has been very difficult to secure a satisfactory bond between the inner layer of the material that is about the roll and the arbor thereof. This is particularly true when the roll is being utilized in a process where the ambient temperature is high and where the coefficients of expansion of the covering material of the roll and that of the arbor differ and particularly in a direction where the covering's coefficient of expansion is greater than that of the arbor. Also if a contact wheel is rotated at surface speeds which are large, there are substantial centrifugal forces there applied particularly to the covering material in changing and irregular patterns which tend to disrupt the bond between the arbor and the covering material.

SUMMARY

A contact roll consisting of a central arbor portion which preferably has axially extending grooves therein, the surface of the arbor having wound thereon a fiber or thread-like member so as to pass over the slots. Covering material is then molded about the arbor or may be formed with material in the slots and thereover so as to form a unitary structure, the threaded material or core being thoroughly imbedded within the covering material and thereby creating a good bond between the arbor structure and the covering material.

DESCRIPTION OF THE DRAWINGS

FIG. 1 is a perspective view of a contact wheel made in accordance with this invention;

FIG. 2 is an elevational view partly broken away indicating the manner in which the covering material is applied to the arbor;

FIG. 3 is a sectional view taken on lines 3—3 of FIG. 2;

FIG. 4 is an enlarged longitudinal sectional view of a slightly modified form of the invention; and FIG. 5 is a sectional view of this modified form.

DESCRIPTION OF THE PREFERRED EMBODIMENTS

A mandrel 10 is provided preferably with an enlargement 11 and the enlargement has a plurality of longitudinally extending grooves 12 here shown as four in number cut in the surface thereof. Preferably for ease in further application of a covering and the bonding material, the surface of the enlarged portion of the mandrel 11 has a helical thread cut therein to form a plurality of V grooves 13. A reinforcing cord 14 is then wound in the grooves 13 which cord may be made of cotton, nylon, rayon, silk, glass or other materials such as metallic wire. Glass and metallic wire are preferred because of their heat resistant properties, and this operation of winding the cord in the grooves may be readily accomplished by placing the mandrel in a lathe or other rotative device and rotating the same at slow speed and guiding the cord onto the large portion of the mandrel 11 with a certain minimum amount of tension so that it is retained either in the grooves 13 or on the surface of the mandrel 11, should helical grooves be eliminated. Helical grooves 13 are to be preferred, however since they will prevent axial displacement of the wound cord upon the surface of the mandrel. The size of the cord used will depend to some extent on the size of the mandrel and the service to which the contact roll will be put. For a typical contact roll such as is illustrated in the drawings the cord may be .015 inch in diameter and is wrapped sixteen turns per inch on an enlarged mandrel section one and one half (1½) inches in diameter. The foregoing is, of course, merely a typical example of a contact roll formed in accordance with the invention and it will be appreciated that sizes will vary over a considerable range in both preferred pitch winding for the cord 14 and the size of cord used. The method of this invention is, however, applicable to all sizes and types of contact rolls regardless of the sizes of cord or the pitch upon which the cord is wound on the mandrel. With the cord wound upon the enlarged portion of the mandrel 11, it will be apparent that it passes over the grooves 12 in spaced relationship to the bottom wall of the grooves 12 and because of the pitch of winding there will be spaces or interstices between each portion of the cord that passes over the groove 12. It will then be possible to mold a material such as polyurethane about the enlarged portion of the mandrel 11, and when this is done, the material will enter the grooves 12 by passing between the interstices that are located between adjacent turns of the cord, and in this fashion an integral structure is formed with the material in the groove 12 being physically bonded to the outer covering material 16. It has been mentioned that polyurethane may be used as the material 16 to form the covering for the contact wheel, and if this is done the polyurethane will adhere to the cord forming a bond therewith. Preferably, therefore, materials that are used for the cord should be of such a construction that they will adhere to the material which will be used for the covering. The resulting structure which is illustrated in section in FIG. 3 resists rotation of the covering material relative to the mandrel since the covering material extends into the grooves 12. Further the covering material is firmly anchored to the mandrel since the cord 14 anchors the covering material onto the surface of the mandrel and further anchors the material within the groove 12 from being dislodged therefrom.

If rubber is used as the covering material, a slightly different technique may be employed to cover the roll. In this instance the steps of the method are slightly altered in that the grooves 12 are first filled with uncured rubber 20 (see FIG. 5) and preferably one ply of uncured sheet rubber is wound about the enlarged section of the mandrel 11 and then the cord 14 is wound about the mandrel. If grooves such as the helical grooves illustrated in the drawings have been formed, a sheet layer of uncured rubber is then wrapped above the helical grooves and then the cord is wound about the sheet layer forcing the layer into the helical grooves as shown in FIG. 4. The cord should be guided to lie within as much of the grooves 13 as is possible. If the grooves are not used then it is merely desired that the cord 14 be wound on to the mandrel with an even pitch. The uncured rubber that is used in the recesses 12 which is identified as 20 as well as the first ply of uncured sheet rubber that is used and which is indicated at 21 should preferably be of a high durometer as for example a durometer of 100. The roll may then be built up in conventional fashion by utilizing pluralities of sheets of uncured rubber which will go over the structure and the durometer of these succeeding layers may be varied so as to produce a roll with the desired characteristics. After the roll has been built up to the desired final diameter, the entire unit may be placed in an open stem vulcanizer and cured. After the completed contact wheel is cooled, it may be placed in a lathe or other rotating piece of machinery and buffed to the desired smoothness. When utilizing rubber as the covering material, the cord as mentioned above should be of a material which is compatible with rubber and will adhere thereto. Cotton is a material which will adhere but does not have extremely good heat properties and therefore nylon is to be preferred. Under some conditions it may be advisable to dip the cord into a bath of plasticizer or the plasticizer applied to the cord after the same has been wound on the mandrel. It is particularly important to utilize a plasticizer when synthetic rubbers are used as for example some of the rubbers that are generally designated as Buna N Rubbers which are of the butadiene-acrylonitrile type. The completed structure is illustrated in the drawings before vulcanization in the enlarged view FIG. 4 and here it will be seen that the individual cords 14 nest in the grooves 13 that have been formed on the surface of the enlarged section of the mandrel 11. After vulcanization the material in the grooves 12 indicated at 20, the layer 21, and the outer covering material 22 become one integral part. Further with this illustration it will be noted that the rubber material within the groove 12 is bonded to the cords 14 and to the outer covering material and in the same fashion as in the previous embodiment prevents dislodgement of the covering material from the mandrel.

While there has been illustrated and described two preferred embodiments of the invention, it will be understood that the same may be otherwise performed and practiced within the scope of the appended claims.

I claim:
1. A method of making a contact roll comprising the steps of cutting longitudinal grooves in the surface of a forming mandrel, winding in helical fashion a cord about the surface of the forming mandrel so that the cords pass over the longitudinal grooves in axially spaced relationship leaving interstices between each pitch of the wind and applying a covering material to the mandrel and in all of the grooves beneath the cord wound across the open edge of the groove and integrating the material in the groove and the outer covering layer by setting.

2. A method as in claim 1 wherein the covering material is flowed into the longitudinal grooves beneath the cords across the grooves.

3. A method as in claim 1 wherein the surface of the mandrel is provided with helical grooves and the cord is wound within the helical grooves.

4. A method as in claim 1 wherein the covering material is rubber and uncured rubber is inserted within the grooves as well as being placed over the grooves and is then vulcanized together.

5. A method as in claim 2 wherein the covering material is polyurethane.

References Cited

UNITED STATES PATENTS

| | | | |
|---|---|---|---|
| 1,163,701 | 12/1915 | Stearns | 264—274X |
| 1,907,303 | 5/1933 | Peterson | 264—274X |
| 1,946,870 | 2/1934 | Moon | 264—Coil Digest |
| 2,066,755 | 1/1937 | Wilkie | 264—274X |
| 2,069,119 | 1/1937 | Standley | 264—274X |
| 2,106,186 | 1/1938 | Mulholland | 264—274X |
| 2,231,738 | 2/1941 | Shoup | 264—274X |
| 2,329,796 | 9/1943 | Stoffer | 264—274X |
| 2,343,747 | 3/1944 | Chernack | 264—Coil Digest |
| 2,592,201 | 4/1952 | Shaw | 264—274X |
| 2,689,395 | 9/1954 | Kupfer | 264—274X |

FOREIGN PATENTS

| | | | |
|---|---|---|---|
| 466,453 | 5/1937 | Great Britain | 264—274 |
| 694,434 | 9/1964 | Canada | 264—274 |

ROBERT F. WHITE, Primary Examiner

A. M. SOKAL, Assistant Examiner

U.S. Cl. X.R.

264—263, 274